(12) United States Patent
Lin

(10) Patent No.: US 11,863,054 B2
(45) Date of Patent: Jan. 2, 2024

(54) KINETIC POWER GENERATION UNIT

(71) Applicant: Kang Chin Lin, Tainan (TW)

(72) Inventor: Kang Chin Lin, Tainan (TW)

(*) Notice: Subject to any disclaimer, the term of this patent is extended or adjusted under 35 U.S.C. 154(b) by 696 days.

(21) Appl. No.: 16/917,988

(22) Filed: Jul. 1, 2020

(65) Prior Publication Data

US 2021/0099054 A1 Apr. 1, 2021

(30) Foreign Application Priority Data

Oct. 1, 2019 (TW) .................................. 108135482
Oct. 1, 2019 (TW) .................................. 108212970

(51) Int. Cl.
*H02K 99/00* (2014.01)
*H02K 1/16* (2006.01)
*H02K 3/28* (2006.01)
*H02K 53/00* (2006.01)

(52) U.S. Cl.
CPC ............... *H02K 99/00* (2016.11); *H02K 1/16* (2013.01); *H02K 3/28* (2013.01); *H02K 53/00* (2013.01)

(58) Field of Classification Search
CPC ......... H02K 47/02; H02K 47/04; H02K 53/00
USPC .......................................................... 310/113
See application file for complete search history.

(56) References Cited

U.S. PATENT DOCUMENTS

2010/0171381 A1* 7/2010 Ling ...................... H02K 53/00
310/113
2016/0049854 A1* 2/2016 Ny ........................... B60L 50/12
74/DIG. 9

FOREIGN PATENT DOCUMENTS

| TW | 200520351 A | 6/2005 |
| TW | 200824254 A | 6/2008 |
| TW | M542291 U | 5/2017 |
| TW | M589390 U | 1/2020 |
| WO | WO2008152510 A2 | 12/2008 |

OTHER PUBLICATIONS

Ferreira et al., Comparison of Different Tapped Windings for Flux Adjustment in Induction Motors, Jun. 2014, IEEE Transactions on Energy Conversion, vol. 29, No. 2, 375-379 (Year: 2014).*

* cited by examiner

*Primary Examiner* — Quyen P Leung
*Assistant Examiner* — Minki Chang

(57) ABSTRACT

A kinetic power generation unit improves the magnetic field of an electric motor and the magnetic field of a power generator into a same magnetic field coupling of a same rotor, so that the rotors of electric motor and the power generator have the same rotational direction, and an exciting winding of the electric motor changes and transmits phases sequentially to a phase voltage by a brushless drive controller, so that an interference effect on the counter electromotive force of the electric motor and the counter-electromotive force of the power generator is changed to a positive effect.

6 Claims, 7 Drawing Sheets

KINETIC POWER GENERATION UNIT

BACKGROUND OF THE INVENTION

Field of the Invention

The present invention relates to a kinetic power generation unit, and more particularly to the kinetic power generation unit capable of changing an interference effect (or a negative effect) on the counter electromotive force of an electric motor and the counter electromotive force of a power generator to a positive effect.

Description of the Related Art

Electric motor, also known as motor, is an electrical device capable of converting electrical energy into mechanical energy and then generating kinetic energy from the mechanical energy to drive other devices. Most electric motors are powered by a magnetic field and a winding current. On the other hand, power generator is an electrical device that converts the energy stored in various primary energy sources into mechanical energy by a prime mover, and then converts the mechanical energy into electrical energy, and finally transmits the electrical energy to different places requiring electricity through a transmission and distribution network, so that the power generator is a device for converting kinetic energy and/or other forms of energy into electrical energy. The principle of the electric motor is the same as that of the power generator, except that the directions of converting different forms of energies are opposite. However, the electric motor generates an induction potential in normal operations, and this potential is called counter electromotive force (cemf) which will block the moving direction of an induction potential conductor, so that the counter electromotive force has an interference effect on the electric motor. In the operation of the power generator, the counter-electromotive force will be produced, and such counter-electromotive force has a negative effect (or interference effect) on the power generator.

In view of the aforementioned drawbacks of the conventional electric motor and power generator with an interference effect or a negative effect on the counter electromotive force of the electric motor and the counter-electromotive force of the power generator during normal operations, the inventor of the present invention provided a feasible solution and developed a kinetic power generation unit in accordance with the present invention to overcome the drawbacks of the prior art.

SUMMARY OF THE INVENTION

Therefore, it is a primary objective of the present invention to provide a kinetic power generation unit capable of changing the interference effect on the counter electromotive force of the power generator and the counter-electromotive force of the electric motor to a positive effect.

The present invention is characterized in that the magnetic field of the electric motor and the magnetic field of the power generator are improved by changing to the same magnetic field coupling and sharing the same rotor, so that the electric motor and the rotor of the power generator will be rotated in the same direction, and the phases of an exciting winding of the electric motor will be changed and transmitted to a phase voltage sequentially by a DC brushless drive controller. Therefore, the interference effect on the counter electromotive force of the electric motor and the counter-electromotive force of the power generator is changed to a positive effect.

The technical plans of the present invention are described in detail as below.

A kinetic power generation unit, comprising an exciting coil winding of an electric motor and a field winding of a power generator installed alternately into a wire slot of a stator to constitute a same magnetic field, and the exciting coil winding and the field winding are composed of a plurality of enameled wires; a rotor installed in the stator, shared by the electric motor and the power generator, and installed coaxially with respect to each other, so that the rotor of the electric motor and the rotor of the power generator rotate in the same direction; the kinetic power generation unit is composed of the electric motor and the power generator, the electric motor and the power generator run individually and output synchronously kinetic mechanical energy and power generating energy, the exciting winding changes phases and is electrically conducted by a DC brushless drive controller to drive the rotor to operate.

According to the above-mentioned kinetic power generation unit, the DC brushless drive controller has an input terminal coupled to a storage battery; a power output terminal of the kinetic power generation unit is coupled to a rectifier, and further coupled to the storage battery for charging the storage battery after an outputted alternating current is rectified, and an AC power passing through a voltage regulator and a transformer is outputted for use; and the after power is supplied for use after the rotor is rotated.

According to the above-mentioned kinetic power generation unit, a plurality of the kinetic power generations is provided and configured in a manner of sharing the coaxial rotors.

According to the above-mentioned kinetic power generation unit, the exciting coil winding of the electric motor and the field winding of the power generator are a single phase or the three-phase configuration; the three-phase configuration uses a delta connection, wherein a connection point of the exciting coil winding of the electric motor between the phases is a three-phase alternating current output point, deriving the counter electromotive force of the electrical motor; the center point of each coil winding is a phase voltage input point; the field winding of the power generator is the power output point, thereby completing the configuration of the three-phase coil winding.

According to the above-mentioned kinetic power generation unit, the exciting coil winding of the electric motor and the field winding of the power generator are a single phase or the three-phase configuration; the three-phase configuration uses a Y connection, wherein an end point on each phase of the exciting coil winding of the electric motor is a power output point, deriving the counter electromotive force of the electric motor; a neutral point of the exciting coil winding is in a delta connection, and the center point of the delta connection is a phase voltage input point; the field winding of the power generator is the power output point, thereby completing the configuration of the three-phase coil winding.

According to the above-mentioned kinetic power generation unit, the exciting coil winding of the electric motor and the field winding of the power generator are a single phase or the three-phase configuration; the three-phase configuration uses a combination of delta & Y connections, and an end point on each phase of the Y connection of the exciting coil winding of the electric motor is coupled to connection point between phases of the delta connection, and the connection point between phases of the delta connection is a three-phase alternating current output point, deriving the counter electromotive force of the electrical motor, and the center point of each coil winding of the delta connection is a phase voltage input point; the field winding of the power generator is the power output point.

The advantage and positive effect is direct to that the magnetic field of the electric motor and the power generator are improved to be a same coupling magnetic field and have same rotor, thereby enabling the rotor of the electric motor and the power generator to rotate in a same direction, and the exciting coil winding of the electric motor changes phases in sequence through a DC brushless drive controller to provide phase voltage. Thus, the interference effect of the counter electromotive force of the electric motor and the power generator is transferred to the positive effect.

The present invention will become clearer in light of the following detailed description of an illustrative embodiment of this invention described in connection with the drawings.

DETAILED DESCRIPTION OF THE PREFERRED EMBODIMENTS

Figure 1:
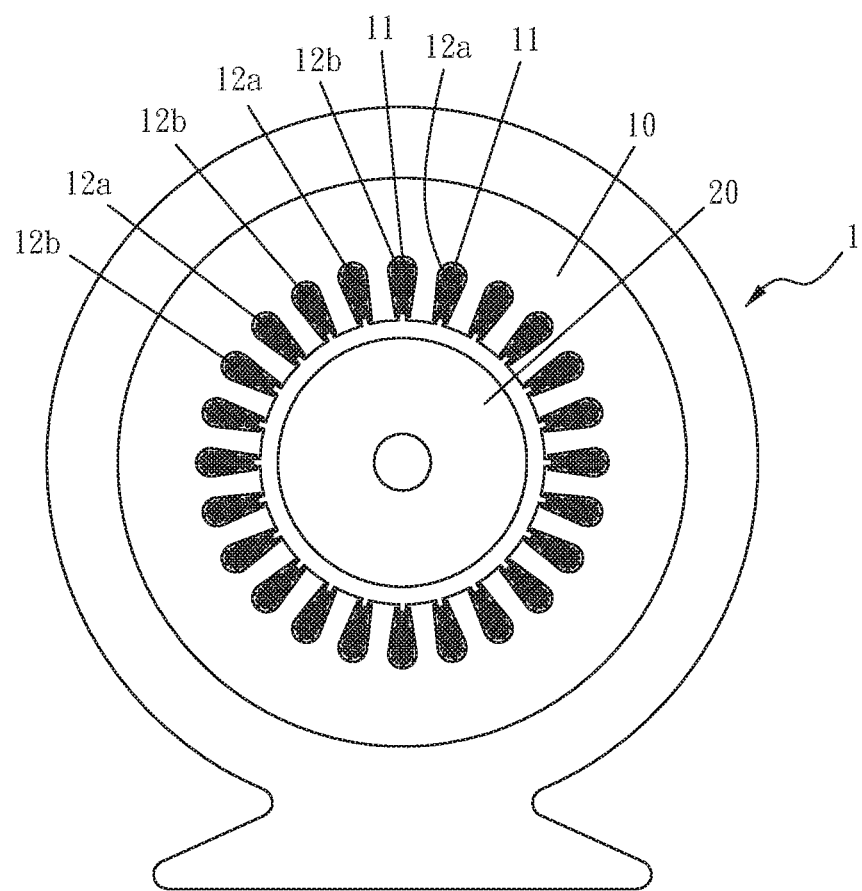
FIG. 1 is a schematic view of an electric motor and a power generator having an exciting winding and a field winding of a same magnetic field in accordance with an embodiment of the present invention.

With reference to FIG. 1 for a kinetic power generation unit 1 in accordance with an embodiment of the present invention, the kinetic power generation unit 1 has the functions of both electric motor 1a and power generator 1b. The kinetic power generation unit 1 is composed of the electric motor 1a and the power generator 1b and the electric motor 1 and the power generator 1b run individually, synchronously outputting the kinetic mechanical energy and electrical energy, the kinetic power generation unit 1 comprises a stator 10, and a rotor 20 installed in the middle inside the stator 10, wherein the stator 10 is in a hollow form and has a plurality of wire slots 11 arranged circularly on an inner wall of the stator 10, wherein an exciting winding 12a of the electric motor 1a and a field winding 12b of the power generator 1b are installed alternately into the wire slots 11. For example, the exciting winding 12 of the electric motor 1a is installed into an odd-numbered wire slot 11 and the field winding 12b of the power generator 1b is installed into an even-numbered wire slot 11 and the electrical coil winding 12a and the field winding 12b are individually composed of a plurality of enameled wires.

Figure 2:
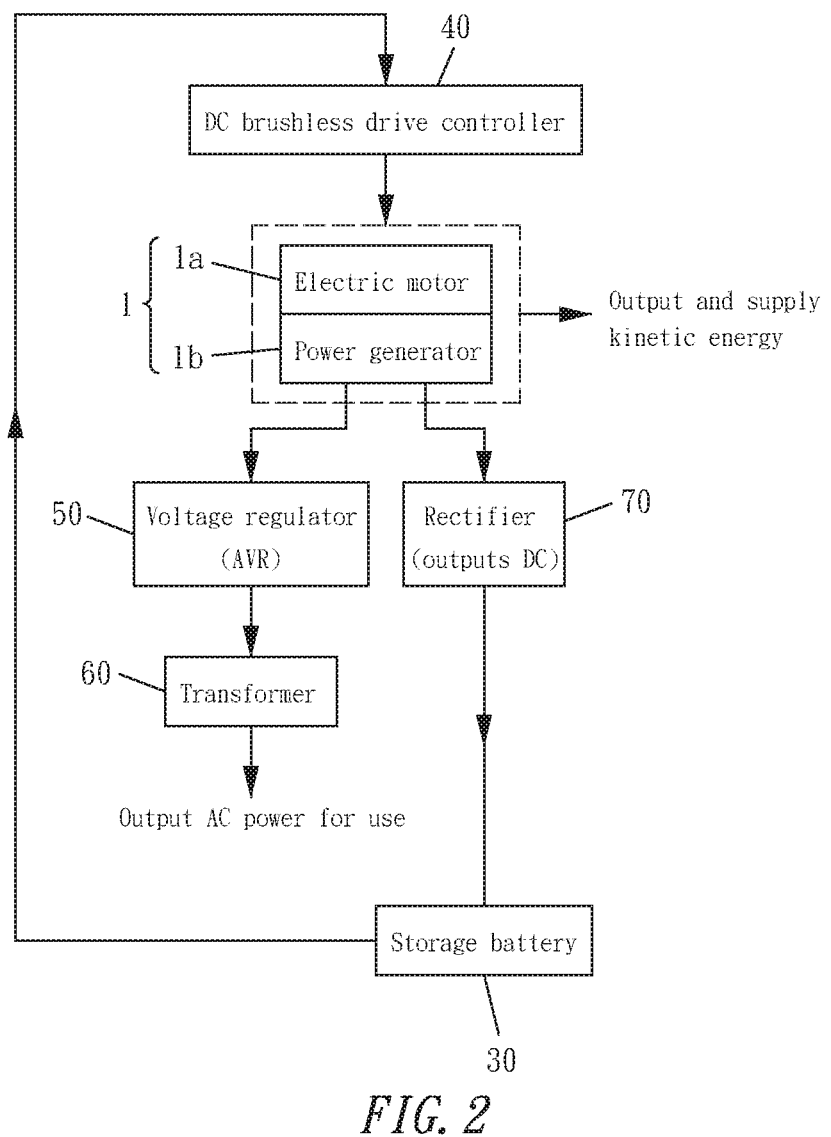
FIG. 2 is a block diagram of a kinetic power generation unit in accordance with an embodiment of the present invention.
Figure 7:
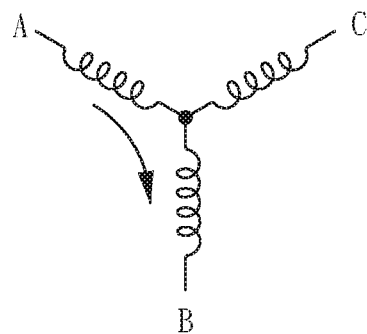
FIG. 7 is a schematic view of showing the DC brushless sequentially electrify the exciting coil windings of the electric motor in accordance with an embodiment of the present invention.
Figure 7:
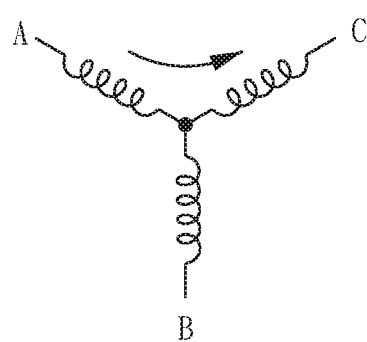
Figure 7:
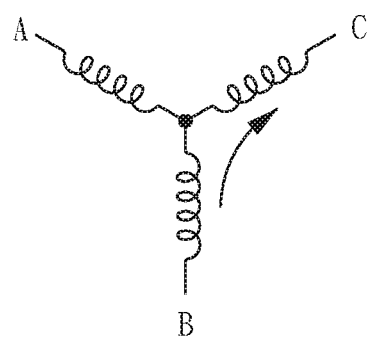

In FIG. 2, the kinetic power generation unit 1 further comprises a storage battery 30, and the current outputted by the storage battery 30 in a phase voltage (that is, split-phase power-on and power-off as shown in FIG. 7, the field winding 12b of the power generator 1b has not be electrified) is supplied to the exciting winding 12a of the electric motor 1a through a DC brushless drive controller 40 in a sequential phase change and electrical conduction method. When the exciting: winding 12a of the electric motor 1a is electrically powered on, a magnetic field coupling will be generated inside the stator 10 to drive the rotor 20 to rotate. After the rotor 20 rotates, the kinetic energy is outputted and supplied. Since the rotor 20 is rotates in the middle surrounded by the exciting winding 12a of the electric motor 1a and the field winding 12b of the power generator 1b, and the exciting winding 12a of the electric motor 1a or the field winding 12b of the power generator 1b move to cut the magnetic lines of force, an induction potential is generated, and the generated electricity is led out from a terminal, and the electricity can be outputted as AC power for use after the voltage of the electricity is transformed by a voltage regulator (AVR) 50 and a transformer 60. On the other hand, the electricity can be outputted as DC power for charging the aforementioned storage battery 30 to increase the power of the storage battery 30 after the electricity is rectified by another transformer 60 and a rectifier 70, thereby becoming a loop of an interconnected cycling cogeneration.

Since the exciting winding 12a of the electric motor 1a and the field winding 12b of the power generator 1b are installed alternately in the wire slots 11 of the stator 10, and the DC brushless drive controller 40 changes their phases and electrically conducts both of them to supply current to the exciting winding 12a of the electric motor 1a and the exciting coil winding 12a of the electric motor 1a and the field winding 12b of the power generator 1b have a same magnetic field coupling and the rotor 20 is shared by the electric motor 1a and the power generator 1b, so that the rotational directions of the rotor 20 of the electric motor 1a and the rotor 20 of the power generator 1b is the same. According to Fleming left hand rule (sometimes called motor rule) and Fleming right hand rule (sometimes called generator rule), the interference effect (or negative effect) of the counter electromotive force generated by the electric motor 1a after its power-on will be the positive effect of the power generator 1b; and the interference effect (or negative effect) of the counter electromotive force generated by the power generator 1b will be the positive effect of the electric motor 1a.

Figure 3:
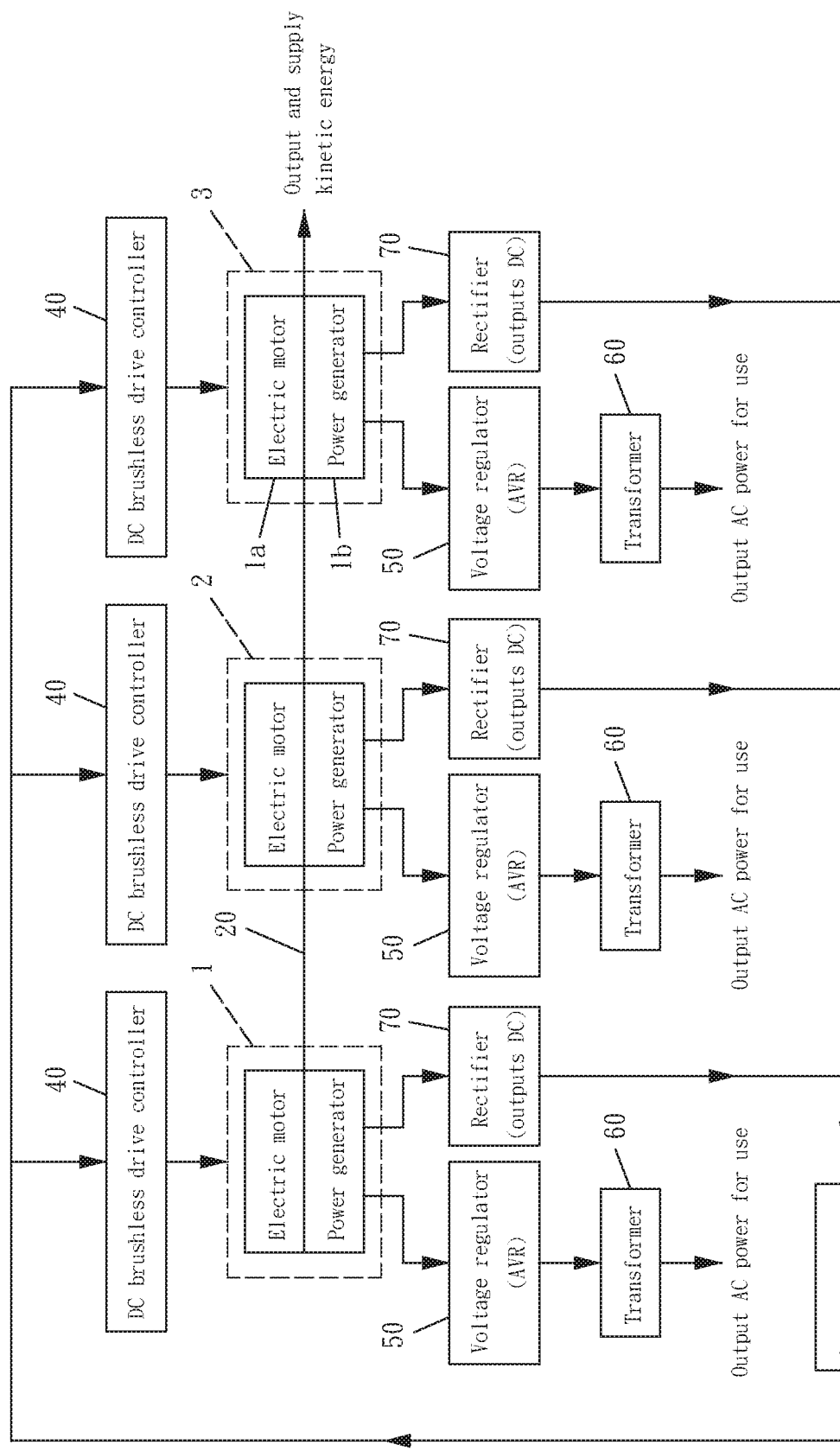
FIG. 3 is a block diagram of a kinetic power generation unit having a plurality of kinetic power generator assemblies in accordance with an embodiment of the present invention.

In FIG. 3, there can be a plurality of kinetic power generation units 1, 2, 3 applied to the present invention, and the kinetic power generation units 1, 2, 3 are connected in series with each other and installed coaxially with the same rotor 20 to increase the output and electric power.

Figure 4:
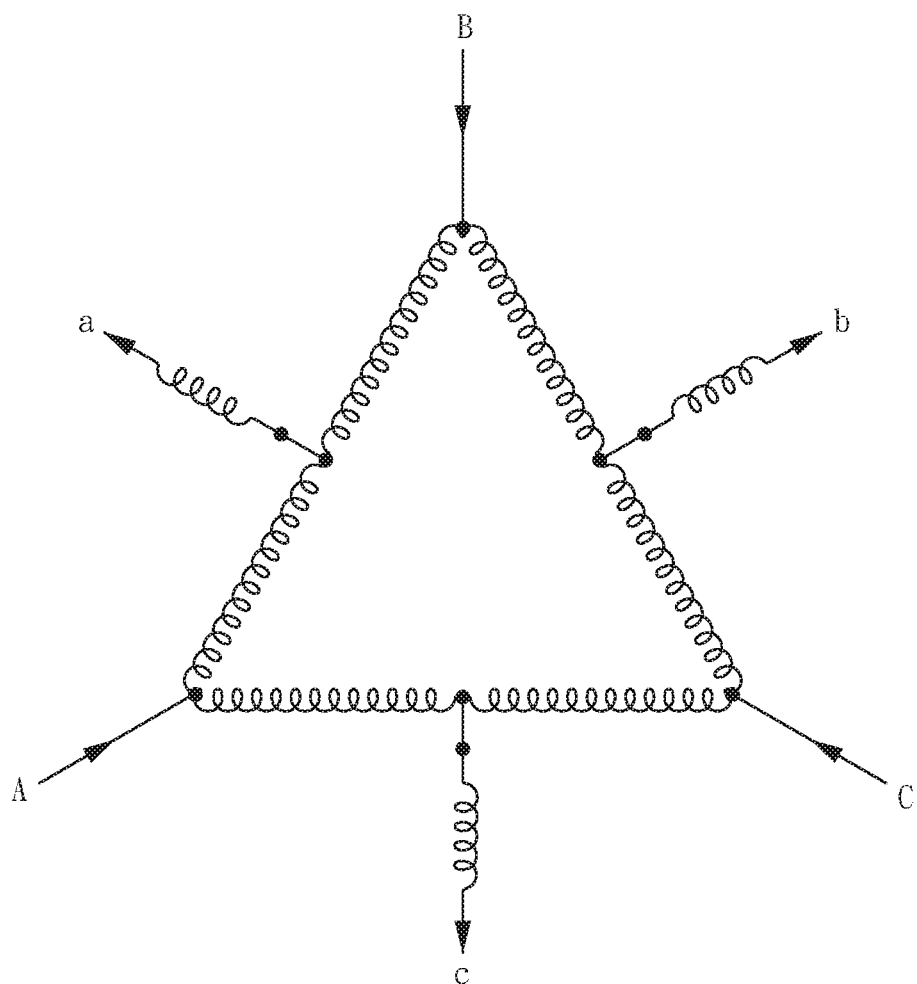
FIG. 4 is a schematic view showing a three-phase winding of the exciting coil winding of the electric motor and the field winding of the power generator of a kinetic power generation unit configured with a delta connection (wherein, the coils of the exciting coil winding of the electric motor and the field winding of the power generator are configured in a same manner but the broken line shows the current deriving end while the delta connection is applied to the field winding of the power generator) in accordance with an embodiment of the present invention.

In an embodiment of the present invention, the exciting coil winding 12a of the electric motor 1a and the field winding 12b of the power generator 1b of the kinetic power generation unit 1 are a single phase or the three-phase configuration; the three-phase configuration uses a three-phase coil winding of a delta connection as shown in FIG. 4, and wherein, a connection point a, b, c between phases of the exciting coil winding of the electric motor 1a is an output point of the three-phase alternating current (that is, the voltage output point of the counter electromotive force); and a center point A, B, C of each coil winding is a voltage input point and the field winding of the power generator uses the delta connection which are all the voltage output points thereby completing the configuration of the three-phase coil winding.

Figure 5:
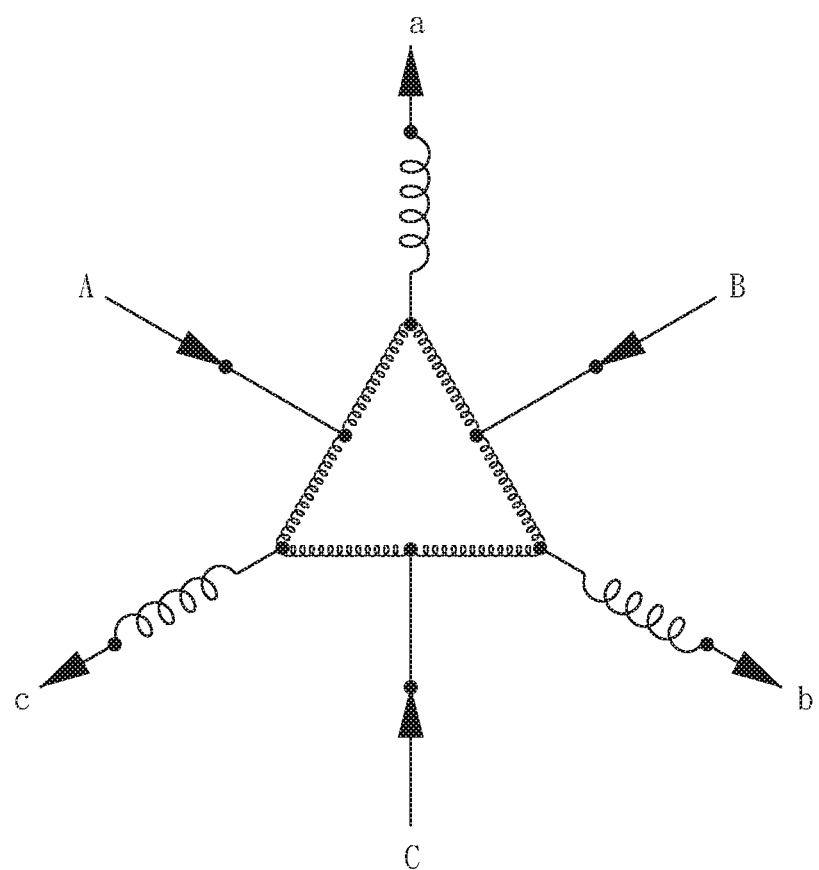
FIG. 5 is a schematic view showing a three-phase winding of the field winding of the power generator and the exciting coil winding of the electric motor of a kinetic power generation unit configured with a Y connection (wherein the coils of the exciting coil winding of the electric motor and the field winding of the power generator are configured in a same manner but the broken line shows the current deriving end while the delta connection is applied to the field winding of the power generator) in accordance with an embodiment of the present invention.

In an embodiment of the present invention, the exciting coil winding 12a of the electric motor 1a and the field winding 12b of the power generator 1b of the kinetic power generation unit 1 are a single phase or the three-phase configuration; the three-phase configuration uses a three-phase coil winding of a Y connection as shown in FIG. 5, and wherein an end point a, b, c on each phase while the Y connection applying to the exciting coil winding 12a is a power output point; a neutral point of the coil winding is in a delta connection, and center points A, B, C of the delta connection are voltage input points, and the center point A, B, C are voltage output points while the Y connection applying to the field winding 12b of the power generator 1b, thereby completing the configuration of the three-phase coil winding.

Figure 6:
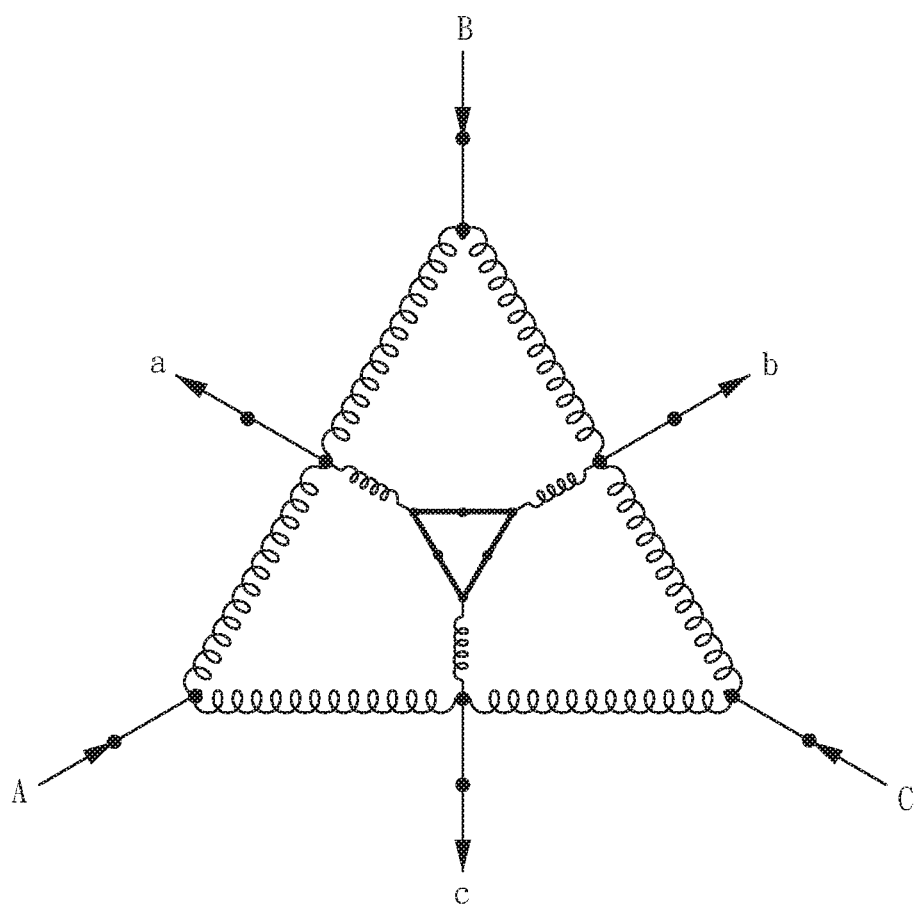
FIG. 6 is a schematic view showing a three-phase winding of the exciting coil of the electric motor and the field winding of the power generator of a kinetic power generation unit configured with a combination of delta & Y connections (wherein the coils of the exciting coil winding of the electric motor and the field winding of the power generator are configured in a same manner but the broken line shows the current deriving end while the delta connection is applied to the field winding of the power generator) in accordance with an embodiment of the present invention.

In an embodiment of the present invention, the exciting coil winding 12a of the electric motor 1a and the field winding 12b of the power generator 1b of the kinetic power generation unit 1 are the delta & Y connections configurations; the three-phase configuration uses a three-phase coil winding of the delta & Y connections as shown in FIG. 6. The Y connection as shown in FIG. 5 is configured inside the delta connection as shown in FIG. 4, and the end point in each phase of the Y connection is coupled to the connection point a, b, c between phases of the delta connection, and the connection point a, b, c between phases of the delta connection is a three-phase alternating current output point (that is, the voltage output point of the counter electromotive force), and the center points A, B, C of each coil winding of the delta connection are the phase voltage input points, and the field winding 12b of the power generator 1b are voltage output points, thereby achieving the joint combination effect.

The DC brushless drive controller 40 sequentially changes phases of the exciting coil winding of the electric motor 1a of the kinetic power generation unit 1 and sends the phase to the phase voltage. In an embodiment as shown in FIG. 7, the Y connection is adopted, and A~B, A~C, and B~C are electrically conducted sequentially, so as to achieve the effect of sequentially changing phases and electrically conducting the coil winding.

In summation, the present invention complies with the patent application requirements, and thus is duly filed for patent application. While the invention is described in some detail hereinbelow with reference to certain illustrated embodiments, it is to be understood that there is no intent to limit it to those embodiments. On the contrary, the aim is to cover all modifications, alternatives and equivalents falling within the spirit and scope of the invention as defined by the appended claims.

REFERENCE NUMBERALS IN DRAWING FIGURES

Kinetic power generation units 1, 2, 3
Electric motor 1a
Power generator 1b
Stator 10
Wire slot 11
Exciting winding 12a
Field winding 12b
Rotor 20
Storage battery 30
DC brushless drive controller 40
Voltage regulator (AVR) 50
Transformer 60
Rectifier 70

What is claimed is:

1. A kinetic power generation unit having a three-phase configuration and, comprising:
   an exciting coil winding of an electric motor;
   a field winding of a power generator installed alternately in a wire slot of a stator to constitute a same magnetic field;
   a rotor installed in the stator, wherein the rotor is shared by the electric motor and the power generator, and installed coaxially with respect to each other, so that the rotor of the electric motor and the rotor of the power generator rotate in the same direction, and the exciting coil winding changes phases and is electrically conducted by a DC brushless drive controller, after inputting power, the exciting coil winding generates a coupling magnetic field to drive the rotor to operate, and meanwhile the field winding derives a power generating energy to output due to the rotation of the rotor;
   wherein the three-phase configuration uses a Y connection, and an end point of the exciting coil winding of each phase is a power output point; a neutral point of the exciting coil winding is in a delta connection, and the center point of the delta connection is a phase voltage input point.

2. The kinetic power generation unit as claimed in claim 1, wherein the DC brushless drive controller has an input terminal coupled to a storage battery; a power output terminal of the kinetic power generation unit is coupled to a rectifier, and further coupled to the storage battery for charging the storage battery after an outputted alternating current is rectified, and an AC power passing through a voltage regulator and a transformer is outputted for use; and the after power is supplied for use after the rotor is rotated.

3. The kinetic power generation unit as claimed in claim 1, wherein the kinetic power generation unit comes with a plurality quantity, and the kinetic power generation units are shared by the rotor and coaxially installed with respect to each other.

4. A kinetic power generation unit having a three-phase configuration and comprising:
   an exciting coil winding of an electric motor;

a field winding of a power generator installed alternately in a wire slot of a stator to constitute a same magnetic field; and a rotor installed in the stator, wherein the rotor is shared by the electric motor and the power generator, and installed coaxially with respect to each other, so that the rotor of the electric motor and the rotor of the power generator rotate in the same direction;

wherein the exciting coil winding changes phases and is electrically conducted by a DC brushless drive controller, and after inputting power, the exciting coil winding generates a coupling magnetic field to drive the rotor to operate, and meanwhile the field winding derives a power generating energy to output due to the rotation of the rotor;

wherein the three-phase configuration uses a combination of delta &Y connections, and an end point of the Y connection in each phase is coupled to connection point between phases of the delta connection, and the connection point between phases of the delta connection is a three-phase alternating current output point, and the center point of each coil winding of the delta connection is a power input point.

5. The kinetic power generation unit as claimed in claim 4, wherein the DC brushless drive controller has an input terminal coupled to a storage battery; a power output terminal of the kinetic power generation unit is coupled to a rectifier, and further coupled to the storage battery for charging the storage battery after an outputted alternating current is rectified, and an AC power passing through a voltage regulator and a transformer is outputted for use; and the after power is supplied for use after the rotor is rotated.

6. The kinetic power generation unit as claimed in claim 4, wherein the kinetic power generation unit comes with a plurality quantity, and the kinetic power generation units are shared by the rotor and coaxially installed with respect to each other.

* * * * *